3,433,872
PALATABLE, FREE-FLOWING, NON-AGGLOM-
ERATING CAFFEINE POWDER
Elmer De Ritter, Glen Rock, and Joseph Edward Raymond, Saddle Brook, N.J., assignors to Hoffman-La Roche, Inc., Nutley, N.J., a corporation of New Jersey
No Drawing. Filed Nov. 25, 1966, Ser. No. 596,792
U.S. Cl. 424—253    2 Claims
Int. Cl. A61k 27/00

ABSTRACT OF THE DISCLOSURE

Caffeine-containing compositions, in the form of small, solid, discrete particles which are tasteless, free-flowing and nonagglomerating, are described. Such compositions are obtained by causing molten droplets, comprising an intimate mixture of caffeine and a mixture of monoglycerides and diglycerides of naturally occurring saturated fatty acids having a carbon chain length of from 16 to 18 carbon atoms, to solidify while being maintained physically separate from each other.

---

This invention relates, in general, to novel compositions and to a process for producing same. More particularly, the invention relates to compositions, in the form of free-flowing powders, which contain caffeine as the active ingredient.

The many and various pharmaceutical uses of caffeine are well documented in the scientific literature. However, due to its highly disagreeable taste, the inclusion of caffeine in products designed for oral administration has caused rather substantial formulation problems. In general, caffeine has been rendered palatable by coating it with a material which is essentially tasteless. While coating techniques have proven to be quite effective in masking the unpleasant taste of caffeine, such techniques have themselves created new problems. For example, due to the relatively high temperatures used in certain prior art processes, extensive losses of caffeine occur by sublimation. Furthermore, the physical characteristics of certain coated prior art products leave much to be desired, a serious material handling problem being presented by the tendency of the prior art products to form agglomerates.

In its broadest embodiment, the present invention is concerned with compositions, in the form of free-flowing powders, which contain caffeine as the active ingredient.

In a more specific embodiment, the invention is concerned with caffeine-containing compositions which are provided in the form of tasteless, free-flowing, nonagglomerating powders.

Compositions having the desired properties are obtained by heating a glyceride mixture, of the type defined hereinafter, to a temperature above its melting point; adding caffeine to, and uniformly distributing same, throughout the molten glyceride mixture; subsequently converting the caffeine-mixed glyceride mixture, while in a molten state, into liquid droplets; and maintaining the liquid droplets physically separate from each other until they assume the form of small, solid, discrete particles. Each such particle comprises caffeine encased in the glyceride mixture.

In the practice of this invention, the glyceride mixture which is used in a product comprising a mixture of monoglycerides and diglycerides of naturally occurring saturated fatty acids having a carbon chain length of from 16 to 18 carbon atoms. Mixtures of glyceryl monostearate and glyceryl distearate which contain substantial amounts of glyceryl monopalmitate and glyceryl dipalmitate are especially well suited for use. Products of this nature are commercially available. One such product, described as a granular food emulsifier, comprising a mixture consisting essentially of mono- and diglycerides of stearic acid and palmitic acid, with not more than 0.01% butylated hydroxy anisole, 0.01% butylated hydroxy toluene and 0.01% citric acid added as preservatives, is available under the trade name "Atmos 150." Additionally, there can be used a glyceride mixture which is commercially available under the trade name "Hydrofol Glycerides T–57–L." Either of these products, or any equivalent product, can be employed in carrying out this invention.

In the preparative method, the glyceride mixture, which serves as the coating material for caffeine, is charged into a suitable vessel. The glyceride mixture is, thereafter, heated to a temperature above its melting point. In the preferred method, the glyceride mixture is heated to a temperature of from about 70° C. to about 80° C. In the second step of the preparative method, caffeine is added to, and by stirring uniformly distributed throughout, the molten glyceride mixture. During this step, the product is maintained at a temperature sufficiently high to keep it in a molten state. The molten mixture is subsequently converted into liquid droplets by any conventional means, for example, by spraying, atomization, etc. In the preferred embodiment of the invention this is accomplished by transferring the molten mixture to a spray-chilling tower or chamber wherein, in sequence, the mass is atomized into liquid droplets which are permitted to fall, by gravity, to the bottom of the tower. During their free-fall, the droplets are quickly chilled by cool air, e.g., air cooled to a temperature of 20° C. or lower, which is passed continuously through the tower. The solidified droplets, or more properly, the small, solid, discrete particles formed from the liquid droplets, are collected in two high efficiency cyclone separators. After their collection, the particles are screened in order to remove agglomerates or other coarse particles. In general, the compositions which are produced in the practice of this invention will be in the form of particles all of which will pass through a 30 mesh screen and up to 50% by weight of which will pass through a 200 mesh screen.

The nature of the device which is used to convert the molten mass into the desired liquid droplets does not limit the scope or the practice of the invention. In general, any conventional atomizing device, such as, a two-fluid nozzle or a high speed centrifugal atomizing wheel, can be used. The only limitation on the device employed is that it is capable of converting the molten mass into liquid droplets which, when solidified, will provide a finished product, the particles of which fall within the particle size range heretofore indicated.

The quantity of the glyceride mixture and the quantity of caffeine which is employed in the practice of this invention, is variable. In general, the compositions will contain from about 25% to about 40% by weight of caffeine and from about 75% to about 60% by weight of the glyceride mixture. The compositions which are produced in the preferred embodiment, however, contain from about 32% to about 36% by weight of caffeine and from about 68% to about 64% by weight of the glyceride mixture.

As indicated heretofore, the compositions of this invention are obtained in the form of powders, all of the particles which pass through a 30 mesh screen and up to about 50% by weight of which pass through a 200 mesh screen. These powders are devoid of the unpleasant taste which characterizes caffeine. They are free-flowing and nonagglimerating and are suitable for use in any of the various pharmaceutical applications in which cafleine itself or the coated caffeine products of the prior art have been employed.

For a fuller understanding of the nature and objects of this invention, reference may be had to the following examples which are given as further illustrations of the invention. All parts given are parts by weight unless otherwise stated.

Example 1

In this example, 60.0 parts of Atmos 150, the glyceride mixture described heretofore, were charged into a vessel and heated with stirring to a temperature of about 75° C. Thereafter, 40.0 parts of caffeine were added to the molten glyceride mixture. The glyceride-caffeine mixture was stirred for a period of about 20 minutes. During this operation, the temperature of the mixture was maintained at about 80° C. When the stirring operation was completed, the mixture was transferred to a centrifugal atomizer rotating at a speed of 12,000 r.p.m., the molten material being fed therein at a rate of 20 gallons per hour. The molten mixture was converted into liquid droplets, which droplets were permitted to fall freely through the spray tower which was air cooled to a temperature of 20° C. The particles carried in the effluent air stream were collected in two cyclone separators. The particles in the cyclone separators, were collected, combined and passed through a 30 mesh screen.

There was thus obtained a tasteless caffeine-containing composition. This composition was in the form of a dry powder all of the particles of which passed through a 30 mesh screen and up to about 50% by weight of which passed through a 200 mesh screen. The powders were free-flowing and nonagglomerating.

Example 2

The procedure, described in Example 1, was repeated, using, however, 66.0 parts of Atmos 150 and 34.0 parts of caffeine.

There was obtained a coated caffeine product in the form of a fine powder, all of the particles of which passed through a 30 mesh screen and up to about 50% by weight of which passed through a 200 mesh screen. This powdery product was free-flowing, nonagglomerating and completely palatable.

Example 3

A product was produced as described in Example 1 using, however, 75.0 parts of Atmos 150 and 25.0 parts of caffeine.

There was thus obtained a coated caffeine product in the form of a fine powder, all of the particles of which passed through a 30 mesh screen and up to about 50% by weight of which passed through a 200 mesh screen. The powder was devoid of the disagreeable taste characterizing caffeine. Furthermore, the powder was free-flowing and nonagglomerating.

We claim:

1. A therapeutic composition in the form of small, solid, discrete particles which pass through a 30 mesh screen and up to 50% by weight of which pass through a 200 mesh screen, which particles consist essentially of (a) from about 25% to about 40% by weight of caffeine and (b) from about 75% to about 60% by weight of a mixture of monoglycerides and diglycerides of naturally occurring saturated fatty acids having from 16 to 18 carbon atoms, said composition having been produced by heating said ingredient (b) to a temperature above its melting point, adding said ingredient (a) to the melted ingredient (b), converting the molten mixture to liquid droplets and maintaining the liquid droplets physically separate from each other until they solidify to discrete particles.

2. The composition of claim 1 wherein there is present from about 32% to about 36% by weight of caffeine and from about 68% to about 64% by weight of said mixture of monoglycerides and diglycerides.

References Cited

UNITED STATES PATENTS

| | | | |
|---|---|---|---|
| 3,035,985 | 5/1962 | Stoyle et al. | 167—82 |
| 3,037,911 | 6/1962 | Stoyle et al. | 167—81 |
| 3,238,103 | 5/1966 | Vogenthaler | 167—82 |
| 2,445,226 | 7/1948 | Landers | 252—363.5 |
| 2,793,979 | 5/1957 | Svedres | 167—82 |
| 3,082,154 | 3/1963 | Allan | 167—82 |

FRANK CACCIAPAGLIA, JR., *Primary Examiner.*

U.S. Cl. X.R.

424—365